UNITED STATES PATENT OFFICE.

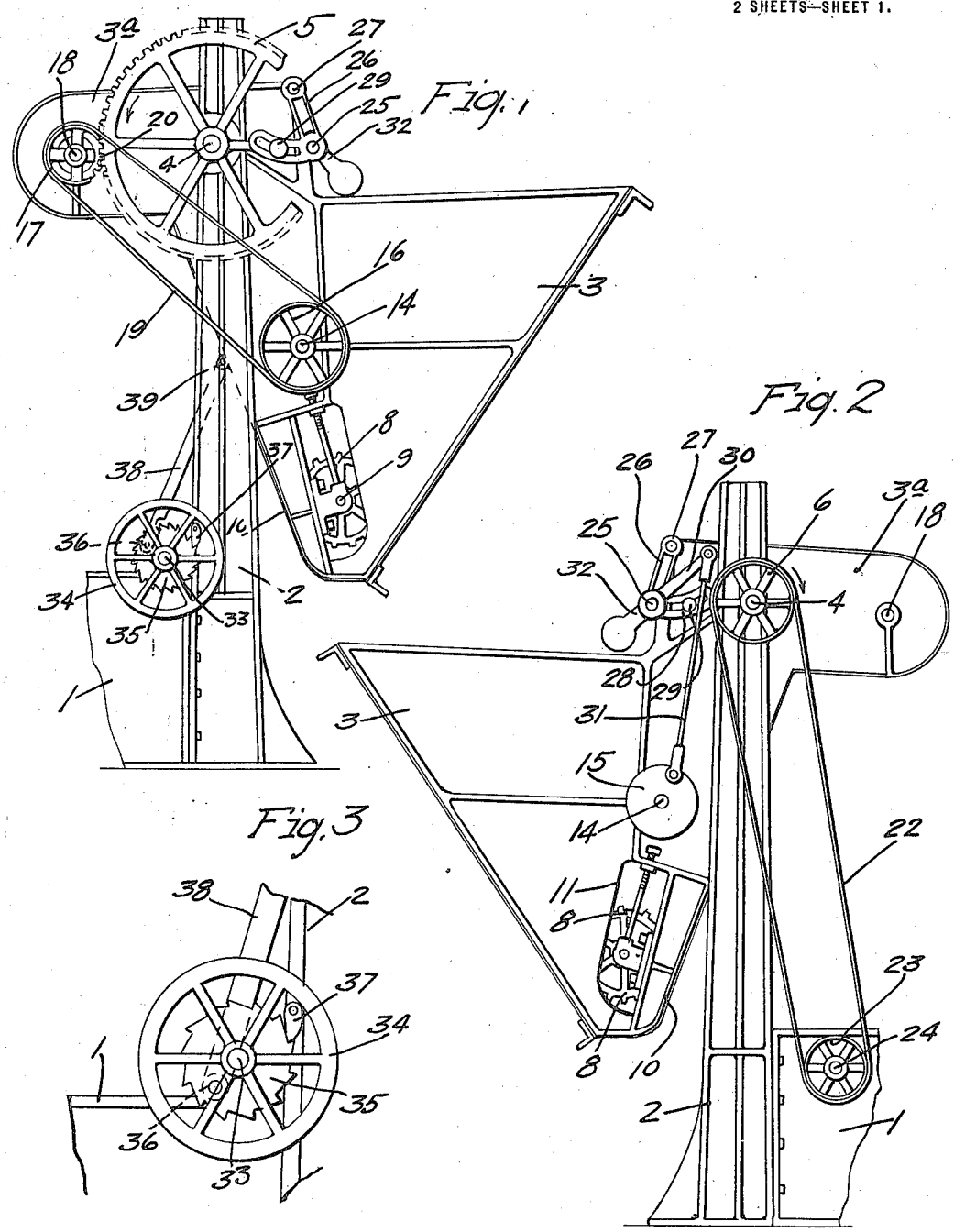

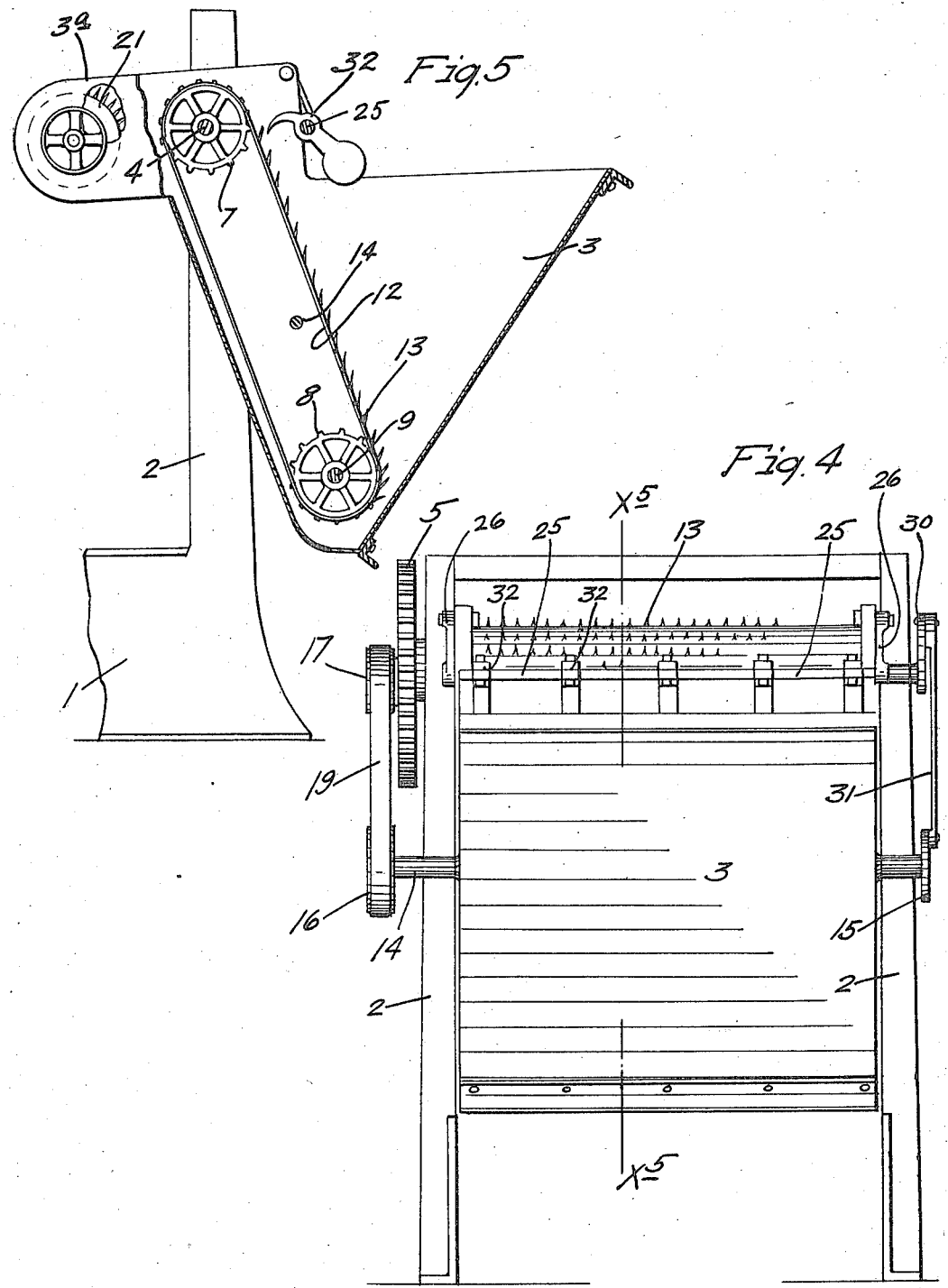

KARL WESSEL, OF DULUTH, MINNESOTA, ASSIGNOR TO WESTERN RUG COMPANY, OF DULUTH, MINNESOTA, A CORPORATION OF MINNESOTA.

FEED-HOPPER FOR FLAX-WORKING MACHINES.

1,233,529.

Specification of Letters Patent.

Patented July 17, 1917.

Application filed May 8, 1915. Serial No. 26,745.

*To all whom it may concern:*

Be it known that I, KARL WESSEL, a citizen of the United States, residing at Duluth, in the county of St. Louis and State of Minnesota, have invented certain new and useful Improvements in Feed-Hoppers for Flax-Working Machines; and I do hereby declare the following to be a full, clear, and exact description of the invention, such as will enable others skilled in the art to which it appertains to make and use the same.

My invention has for its object to provide an improved feed hopper with coöperating feed mechanism especially adapted for use in connection with machines for making tow from flax straw; and to such ends, generally stated, the invention consists of the novel devices and combinations of devices hereinafter described and defined in the claim.

The invention is illustrated in the accompanying drawings wherein like characters indicate like parts throughout the several views. Referring to the drawings:

Figure 1 is a left side elevation showing the improved hopper and feed mechanism applied to a machine of the character indicated;

Fig. 2 is a right side elevation of the parts shown in Fig. 1;

Fig. 3 is a detail in left side elevation showing the device for adjusting the tilting movements of the hopper;

Fig. 4 is a front elevation of the parts shown in Figs. 1 and 2; and

Fig. 5 is a vertical section taken approximately on the line $x^5$ $x^5$ on Fig. 4, some parts being shown in full and some parts being removed.

The numeral 1 indicates the bed frame of the tow making machine, the same at its front end having upright laterally spaced bearing pedestals 2.

The feed hopper 3, at its upper portion, is pivotally connected to the pedestals 2, and a counter shaft 4 is journaled therein and in the pedestals 2 concentric to the pivotal connection between the said hopper and pedestals. This counter shaft 4, at one projecting end, is provided with a large spur gear 5 and at its other projecting end, it is provided with a pulley 6. The counter shaft 4 is provided with sprocket wheels 7 that are alined with corresponding sprockets 8 carried by an idle counter shaft 9 located in the bottom of the hopper and journaled to the sides thereof. The said idle counter shaft 9 is directly journaled in bearings 10 located in openings 11 in the sides of the hopper 3 and adjustably secured to flanges on the sides of the said hopper.

Sprocket chains 12 run over the alined sprockets 7 and 8, and these chains with closely positioned transverse barb-equipped slats 13. The numeral 14 indicates a counter shaft journaled in the sides of the hopper 3 and extended between the upwardly and downwardly moving runs of the chains 12. At one projecting end, the shaft 14 is provided with a crank 15 shown as in the form of a disk, and at its other projecting end, it is provided with a pulley 16 that is alined with a pulley 17 of a short counter shaft 18 journaled in an extended hood portion 3ª of the hopper 3. A belt 19 runs over the pulleys 16 and 17. Adjacent to the pulley 17, the counter shaft 18 is provided with a spur pinion 20 that meshes with the large spur gear 5. Inside of the hood 3ª the counter shaft 17 carries a feed roller 21 which assists in throwing the straw downward from the upper delivery portion of the barbed conveyer 12 and 13.

A driving belt 22 runs over the pulley 6 on the counter shaft 4 and over a pulley 23 carried by a counter shaft 24 journaled in the frame bed 1 and driven through means, not shown, from certain of the running parts of the machine.

The numeral 25 indicates an oscillatory shaft journaled in arms 26 of a rock shaft 27 that is journaled to the upper portion of the hood 3ª. The arms 26 have slotted segmental portions 28 that are concentric to the axis of the rock shaft 27 and are adapted to be rigidly but adjustably secured to the sides of the hood 3ª by clamping bolts or similar devices 29. The oscillatory shaft 25 is provided at one projecting end with a crank arm 30, the throw of which is much longer than that of the crank disk 15. The wrist pin of the crank disk 15 is connected to the free end of the arm 30 by a pitman or connecting rod 31. A plurality of laterally spaced counter-weighted hook-like doffer fingers 32 are secured to the vibratory shaft 15 within the hopper, in position for action to elevate straw at points close to the top of the barbed elevator belt or conveyer made up of the chains 12 and slats 13.

For imparting oscillatory adjustments to the hopper 3, around the axis of its pivotal support, to-wit, on the axis of the counter-shaft 4, I provide an adjusting device best shown in Figs. 1 and 3. This device, as preferably constructed, comprises a transverse shaft 33 mounted in suitable bearings on the bed frame 1, and provided at one side of the machine with an operating hand wheel 34 and with a ratchet wheel 35. The ratchet wheel 35 has a crank pin 36, and the said ratchet wheel is normally held against backward rotation by a lock dog 37 pivoted to one of the pedestals 2. A connecting rod or bar 38 is journaled at its lower end to the crank pin 36 of the ratchet wheel 35, and at its upper end, is pivotally connected at 39 to one side of the back portion of the hopper 3.

The downward swinging movement of the hopper 3 is resisted by the connecting rod 38, when the ratchet wheel 35 is locked against backward rotation, and by adjustments of the said ratchet wheel, the said connecting rod may be moved so as to set the hopper in different positions with its barbed elevator belt positioned at various different inclinations.

The flax straw or like material is fed or thrown into the hopper 3 by any suitable means, not necessary for the purposes of this case to consider. Assuming that the elevator belt or conveyer 13—14 is driven at a constant speed, it is evident that it will carry the straw upward much faster when adjusted toward a horizontal position than when adjusted toward a vertical position. Otherwise stated, the feed of the straw from the hopper will be at a minimum when the said elevator conveyer is in a vertical position and its capacity to elevate and feed straw will be increased as the hopper is adjusted to throw the same nearer and nearer to a horizontal position. It is not necessary nor desirable that the said elevating conveyer at any time be moved anywhere near to a horizontal position, as its variations in feeding capacity may be properly regulated by adjustments through approximately thirty degrees or less.

When the elevating feed belt is in action, the so-called doffer fingers 32 are constantly vibrated back and forth and serve to rake off surplus stock from the elevator belt. To vary the amount of stock that can pass them, they may be set to work closer to or farther from the elevating belt, such adjustments being accomplished by moving the oscillating shaft 25 toward or away from the said elevator belt. When the elevator belt is adjusted toward a horizontal position, the doffer should be adjusted farther away from the elevator belt, so as to permit the elevator belt to carry its increased load. The doffer, however, in all instances, assists in maintaining a regular feed of the stock by preventing the same from going over in bunches.

The mechanism described has been put into actual use in connection with a machine for making tow from flax straw and has been found highly efficient for the purposes had in view.

What I claim is:

A feed hopper of the kind described, mounted for adjustments on a horizontal pivot and provided with an endless elevating feed belt, which, by adjustments of said hopper, may be set at different inclinations, and a power-driven vibratory doffer mounted for adjustments toward and from the upper portion of said elevating belt.

In testimony whereof I affix my signature in presence of two witnesses.

KARL WESSEL.

Witnesses:
BERNICE G. WHEELER,
HARRY D. KILGORE.

Copies of this patent may be obtained for five cents each, by addressing the "Commissioner of Patents, Washington, D. C."